(12) United States Patent
Terjung

(10) Patent No.: US 11,033,045 B2
(45) Date of Patent: Jun. 15, 2021

(54) APPARATUS AND PROCESS FOR PRODUCING SAUSAGE PRODUCTS

(71) Applicant: Deutsches Institut fuer Lebensmitteltechnik e.V., Quakenbrueck (DE)

(72) Inventor: Nino Terjung, Quakenbrueck (DE)

(73) Assignee: DEUTSCHES INSTITUT FÜR LEBENSMITTELTECHNIK E.V., Quakenbrueck (DE)

( * ) Notice: Subject to any disclaimer, the term of this patent is extended or adjusted under 35 U.S.C. 154(b) by 130 days.

(21) Appl. No.: 15/725,543

(22) Filed: Oct. 5, 2017

(65) Prior Publication Data

US 2018/0098562 A1    Apr. 12, 2018

(30) Foreign Application Priority Data

Oct. 6, 2016 (DE) .......................... 102016119007.1
Nov. 1, 2016 (DE) .......................... 102016120794.2

(51) Int. Cl.
| | |
|---|---|
| *A22C 11/02* | (2006.01) |
| *A22C 11/00* | (2006.01) |
| *A23L 13/60* | (2016.01) |
| *A23B 4/12* | (2006.01) |
| *A22C 18/00* | (2006.01) |
| *A23L 13/40* | (2016.01) |

(52) U.S. Cl.
CPC .............. *A23L 13/65* (2016.08); *A22C 11/00* (2013.01); *A22C 11/008* (2013.01); *A22C 11/0281* (2013.01); *A22C 18/00* (2013.01); *A23B 4/12* (2013.01); *A23L 13/428* (2016.08); *A23V 2002/00* (2013.01)

(58) Field of Classification Search
CPC .......... A23L 13/65; A22C 11/008; A63B 4/12
USPC ....................................................... 426/55, 56
See application file for complete search history.

(56) References Cited

U.S. PATENT DOCUMENTS

| | | | | |
|---|---|---|---|---|
| 4,265,918 A | * | 5/1981 | Kueper .................. | A23L 13/00 426/264 |
| 6,989,170 B2 | * | 1/2006 | Konanayakam ........ | A23L 13/65 426/243 |

FOREIGN PATENT DOCUMENTS

| | | |
|---|---|---|
| DE | 69307395 T2 | 5/1993 |
| DE | 102008004242 A1 | 6/2009 |
| GB | 2555008 B | 5/2019 |

OTHER PUBLICATIONS

EP 0572305—Machine Translation (Year: 1993).*

* cited by examiner

*Primary Examiner* — Hamid R Badr
(74) *Attorney, Agent, or Firm* — Greer, Burns & Crain, Ltd.; Steven P. Fallon

(57) ABSTRACT

Process and an apparatus adapted to carry out the process steps for producing sausage products, which includes the following steps: Comminuting raw meat with fat, adding seasoning, salt and further additives, mixing in order to produce a raw sausage mass, forming the raw sausage mass, warming and fermenting the formed raw sausage mass, warming the formed fermented sausage mass to a temperature of approximately 57° C., and incubating at approximately 57° C. for germ reduction, immediately subsequently cooling the cooked fermented sausage mass to −1° C. or below with reduced pressure being applied, in order to produce a dried and cooled cooked sausage mass.

17 Claims, 1 Drawing Sheet

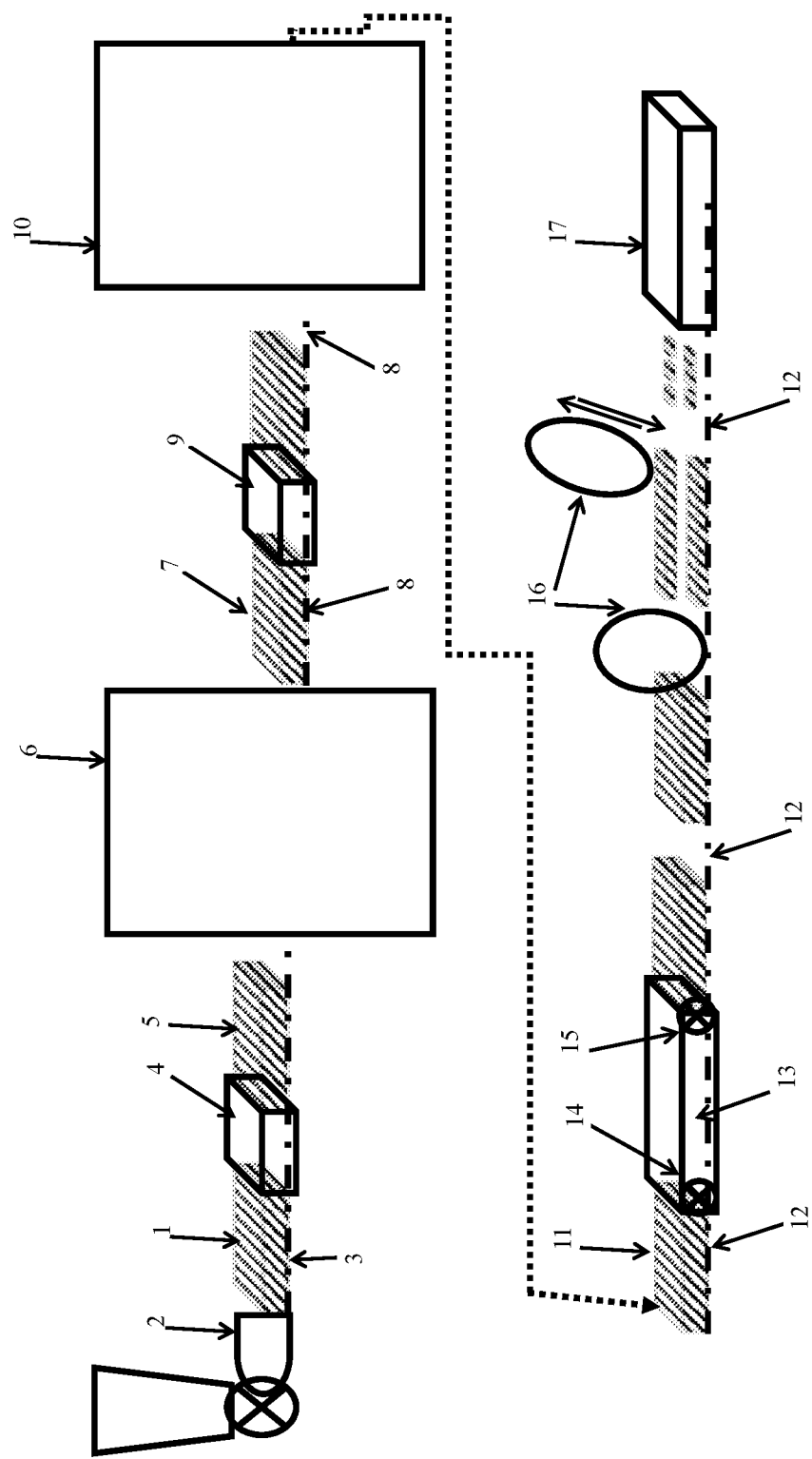

APPARATUS AND PROCESS FOR PRODUCING SAUSAGE PRODUCTS

PRIORITY CLAIM AND REFERENCE TO RELATED APPLICATION

The application claims priority under 35 U.S.C. § 119 and all applicable statutes and treaties from German patent applications 10 2016 119 007, filed on Oct. 6, 2016, and of 10 2016 120 794, filed on Nov. 1, 2016.

FIELD

A field of the invention is sausage product production. Apparatuses and methods of the invention are applicable, for example, to raw and cooked sausage production.

BACKGROUND

U.S. Pat. No. 6,524,633 B2 describes the production of sliced sausage by comminuting meat and mixing with starter cultures, salt, seasoning, and further ingredients, and forming the mixture by filling in casings or without casings by extrusion onto a sieve support. For fermentation, the formed mixture is incubated at approximately 38° C. for 12 to 18 h, subsequently warmed to a core temperature of approximately 58° C., then cooled to 1.6° C. at most, cut and continuously dried with air of approximately 10-49° C. in an air stream for 0.5 to 1.5 h. The sliced sausage produced that way is frozen and packed for storage US 2015/0313268 A1 describes the drying of fermented and cut sausage with air using microwave heating.

SUMMARY OF THE INVENTION

A preferred process of the invention comprises or consists of the following steps:
1. comminuting of raw meat, which preferably is raw meat with fat, for example by grinding, especially at a temperature of the meat of from 4° C. to −10° C., preferably from −2° C. to −10° C., e.g. −6° C.;
2. adding of seasoning, salt, preferably curing salt, adding an acidifying agent, which is gluconodeltalactone or, preferably, is a starter culture, optionally adding of further additives, e.g. liquid seasoning, glucose, ascorbic acid, optionally adding of water, e.g. from 10 to 12%, or without adding water;
3. mixing, for example by means of a tumbler, cutter or a different mixing device, preferably at a temperature of from 4° C. to −10° C., preferably of from −2° C. to −10° C., e.g. −6° C., for producing a raw sausage mass;
4. optionally additionally comminuting;
5. forming of the raw sausage mass, preferably at a temperature of from 4° C. to −10° C., preferably of from −2° C. to −10° C., e.g. from −4 to −6° C., by depositing onto a carrier, optionally by the filling of sausage casings or boxes, especially without sausage casing, wherein the carrier preferably is a continuously running conveyor belt, optionally including applying pressure during the forming, for producing a formed raw sausage mass;
6. optionally, at least when a starter culture is added in step 2), warming of the formed raw sausage mass, for example by contacting with warm surfaces and/or by irradiating, until reaching a core temperature of at least approximately 20° C., e.g. from 25° C. to 42° C., preferably of from approximately 30° C. to 37° C., preferably warming by applying electric current having a power for reaching a core temperature of approximately 20° C. or approximately from 25° C. to 42° C., preferably of from 30° C. to 37° C., preferably 35° C., within 30 s or within 2 to 10 min, preferably within 30 s to 5 min, or up to 2 min, for producing a formed raw warmed sausage mass; and
7. at least when a starter culture is added in step 2), fermenting of the formed raw warmed sausage mass until reaching a pH value of from 4.6 to 5.2, or to 5, preferably pH 4.8, by incubation at from 30° C. to 37° C., preferably 35° C., for example for 6 to 24 h, preferably 7 to 10 h, for producing a formed fermented sausage mass, which is acidified;
8. warming of the formed sausage mass acidified by fermenting or of the formed sausage mass acidified by added gluconodeltalactone, to a temperature of from at least 42° C. to at least 45° C., preferably to at least 47° C., e.g. up to 65° C. at most, particularly preferably to at least or exactly approximately 57° C., for example by contacting with warm surfaces and/or by irradiating, preferably by applying electric current, especially having a power sufficient for reaching the temperature within 10 min, preferably within 1 to 5 min as the core temperature; and
9. optionally, especially when a starter culture is added in step 2), warming to approximately 57° C. and incubating at a temperature of approximately 57° C. for a time sufficient for germ reduction, especially for pasteurizing, for example until inactivation of an added starter culture, especially for from 45 min to 90 min, preferably for approximately 60 min, for producing a warmed, and optionally cooked, fermented, respectively acidified sausage mass;
10. immediately subsequently cooling of the warmed and, by fermenting or added gluconodeltalactone, acidified sausage mass to −1° C., preferably −2° C. or below, in at maximum 30 min, with a vacuum being applied, to produce a dried and cooled, optionally cooked sausage mass;
11. optionally, further cooling to a temperature of 0° C. or below, e.g. to −5° C. or −10° C. or below;
12. cutting of the dried and cooled fermented, respectively acidified sausage mass to obtain a cut and cooled, optionally cooked sausage product.
13. optionally, additionally drying of the cut, optionally cooked sausage product, especially at the temperature of −2° C. or below, e.g. at −10° C. or below, for example by vacuum drying, e.g. at an absolute pressure of 2 hPa or 20 hPa to 100 hPa;

wherein preferably the steps 5) to 13) proceed continuously one after the other.

BRIEF DESCRIPTION OF THE DRAWING

FIG. 1 shows a preferred apparatus for the production of sausage products in accordance with the invention.

DETAILED DESCRIPTION OF THE PREFERRED EMBODIMENTS

Preferred apparatuses and processes of the invention address problems in prior processes for producing cooked sausage products. Apparatuses and processes of the invention can quickly carry out production and reduce the growth of undesired microorganisms.

This process is advantageous insofar as the sausage mass quickly passes through the temperature stages, so that the growth of undesired microorganisms and other processes of spoiling are essentially avoided. In this respect, the warming in step 6), preferably by applying electric current, leads to a uniform and quick warming to the fermentation temperature through the complete cross section of the formed raw sausage mass. The warming of the formed fermented sausage massmass to at least 42° C. or to at least 45° C., e.g. to at maximum 65° C., preferably approximately 57° C. core temperature, especially by applying electric current, in step 8) also leads to a quick warming through the complete cross section of the formed fermented sausage massmass. The warming in step 8) leads to a hardening of the sausage mass due to an at least partial denaturation of protein, wherein higher temperatures, e.g. 57° C., especially in connection an incubation at this temperature, additionally lead to germ reduction. Generally, indications concerning the temperature of meat or sausage mass relate to their temperature.

The acidification by adding gluconodeltalactone as the acidifying agent allows a process without the steps 6) to 7) and, optionally, without step 9), so the process may consist of the steps 1) to 5), 8), optionally step 9), and the steps 10) to 13). Gluconodeltalactone is added in a concentration of 0.3 to 1.0% by weight, preferably 0.3 to 0.5% by weight, especially in connection with a warming to from 42° C. to 57° C., e.g. to 45° C. with subsequent cooling with vacuum being applied.

In step 1) the temperature of the meat optionally is the mixing temperature of the meat.

Step 1) may optionally proceed in that the frozen meat, which preferably is frozen meat with fat having, for example a temperature of −18° C. or below, is comminuted, and fresh meat, with or without fat, e. g. having a temperature of 0° C. to 5° C., is comminuted, the comminuted frozen meat and the comminuted fresh meat are subsequently or simultaneously mixed, preferably after the addition of seasoning, salt, a starter culture or gluconodeltalactone as acidifying agent, and further additives according to steps 2) and 3), for example by means of a cutter. In one embodiment, the frozen meat and the fresh meat are comminuted in a comminuting device, for example in a cutter, wherein optionally seasoning, salt, preferably curing salt, a starter culture, optionally further additives are added and blended in, according to the steps 2) and 3). The masses of frozen and fresh meat are calculated such that a temperature of the mixture of −2 to −10° C. results, which temperature is preferred according to the invention.

For example, the meat can be composed of:

30 to 40%, preferably 35%, frozen lean pork belly (approx. 28% fat), 20 to 30%, preferably 25%, fresh lean pork belly (approx. 28% fat), 30 to 40%, preferably 36%, frozen pork belly (approx. 58% fat), and 0 to 10%, preferably 5%, frozen beef (approximately 50% fat).

The forming of the raw sausage mass in step 5) may, if the forming is carried out by depositing onto a continuously running conveyor belt, be carried out by pressing the raw sausage mass through a nozzle, for example by extrusion. Therein, the optional additional comminuting of step 4) may be carried out by pressing by means of extrusion. The forming preferably may be carried out into a form having a rectangular cross section. Preferably, the forming is carried out continuously onto a running conveyor belt. The forming of a rectangular cross section allows the uniform warming, for example by contacting with warm surfaces, by irradiating, or by applying electric current.

The warming in step 6), especially by applying electric current to the formed raw sausage mass, is preferably carried out continuously, while the formed raw sausage mass is conveyed on a conveyor belt, for example by two electrodes lying against opposite surfaces of the formed raw sausage mass, to which an opposite polarity of electric current is applied. Therein, an electrode may be formed by the conveyor belt, on which the formed raw sausage mass is conveyed, and the other electrode may rest on the formed raw sausage mass in parallel to the conveyor belt.

The fermenting by incubation in step 7) is carried out preferably during transport of the formed raw warmed sausage mass during incubation, in order to continue conveying of the sausage mass. In order to do this, the formed raw warmed sausage mass may be transported continuously or batch-wise, for example after being cut transversely to the conveying direction, through a fermentation room, for example by means of a paternoster. The fermentation room preferably is temperature-controlled to a temperature of from 35° C. to 37° C.

Preferably, the formed fermented, respectively acidified sausage mass obtained from step 7) is conveyed on a conveyor belt and during this procedure is warmed in step 8) by applying an electric current. Therein, the formed fermented, respectively acidified sausage mass is preferably transported on a conveyor belt and, for example, current is applied by two electrodes lying against opposite surfaces of this sausage mass, to which an opposite polarity of electric current is applied. Therein, an electrode may be formed by an electrically insulated section of the conveyer belt, on which the formed fermented sausage mass is conveyed, and the other electrode may rest on the formed fermented sausage mass in parallel to the conveyor belt.

In embodiments, in which the acidifying agent is gluconodeltalactone, the steps 6) and 7) preferably are omitted, because a fermentation to acidify the sausage mass is not necessary. In this embodiment the process may thus comprise or consist of the steps 1) to 5 and step 8), preferably step 9), step 10), and preferably steps 11) to 13). The device usable for this embodiment thus preferably has only the warming device for warming the raw sausage mass, which is adapted to the warming of the sausage mass acidified by added gluconodeltalactone to at least 42° C., preferably 57° C., preferably including a holding space arranged thereafter and having a temperature of at least 42° C., preferably 57° C., and the cooling device arranged thereafter. This warming device corresponds to the so-called second warming device in the embodiment, which has two warming devices, the first warming device of which serves the warming to the temperature for fermentation with a starter culture added as the acidifying agent.

The optional incubation of step 9), for example at a temperature of approximately 57° C., preferably is carried out in a temperature-controlled holding space. Preferably, the sausage mass is transported during the incubation, for example continuously or batch-wise, for example by means of a paternoster, in order to continue conveying of the sausage mass.

The cooling of the cooked fermented sausage mass in step 10) with vacuum being applied, which is carried out immediately subsequently to the warming of step 8) or to the incubating of step 9), also leads to quick drying, so that the dried and cooled sausage mass is ready for being cut. The vacuum may amount to, for example in the range of from 100 to 2 hPa absolute or below, e.g. 100 to 20 hPa absolute.

During the drying and cooling in step 10) the vacuum is maintained by sucking off air, respectively water vapour. Preferably, the cooling and drying is carried out at approximately 20 hPa absolute pressure for, e.g. 20 to 40 min, especially 30 min. Preferably, step 10) is carried out during conveying the sausage mass acidified by fermenting, respectively addition of gluconodeltalactone, for example by means of a conveyor belt, in order to continue conveying the sausage mass. Therein, the fermented or acidified sausage mass may enter continuously or batch-wise through an entry lock into a cooling device, to which vacuum is applied, and leave the cooling device through an exit lock. In this manner, step 10) may proceed continuously.

The cutting in step 13) may be, for example, a cutting into slices or into cubes. Preferably, step 13) is carried out continuously.

The device which is adapted for being used in the process, has a comminuting device, for example at least one grinder, which is adapted to comminuting the raw meat in step 1), preferably a continuous or batch-wise metering device for salt and the further additives of step 2), a mixing device, for example a tumbler or cutter for the mixing in step 3), optionally including the additional comminuting of step 4), in order to produce the raw sausage mass from pieces of meat.

For the forming in step 5) the device has a forming unit, for example a pressing or pumping device, for example an extruder, with a connected nozzle. In the embodiment as an extruder the pressing or pumping device may also be adapted to carry out the optional additional comminuting of step 4).

Preferably, the device has a first conveyor belt for the transport of the sausage mass, which exits the forming unit. Furthermore preferably, the first conveyor belt is arranged through the first warming device, which preferably is a first electric warming device, so that after the forming the sausage mass is continuously conveyed through the first warming device.

Generally, the conveyor belts of the device may be divided into sections, which optionally are electrically insulated against each other.

A first electrical warming device for the warming by applying electric current to the sausage mass in step 6) has at least two electrodes adjacent to the cross section of the sausage mass in order to contact the same for introducing current. The electrodes are connected to a current source, adapted to apply current to the electrodes, which is sufficient for a warming to from 30° C. to 37° C. within the time period, during which the electrodes are contacting the same cross section of the sausage mass between each other.

For the fermenting in step 7) the device has a fermentation room temperature-controlled to a temperature of from 30° C. to 37° C., preferably to 35° C. The fermentation room preferably has a conveyor device, which is adapted to convey the sausage mass for the period of fermentation through the fermentation room. Therein, the conveyor device in the fermentation room preferably is connected to the first conveyor belt, such that the sausage mass is continuously taken over from the first conveyor belt.

Connected to the fermentation room, preferably connected to its conveyor device, a second conveyor belt is arranged, which is adapted to take over the sausage mass, which is conveyed out of the fermentation room and to convey the sausage mass through a second warming device, which preferably is a second electrical warming device, by which the sausage mass is warmed in step 8). The second electrical warming device has at least two electrodes adjacent to the cross section of the sausage mass, in order to contact the same for introducing current. The electrodes are connected to a current source, which is adapted to apply current to the electrodes, which is sufficient for a warming to approximately 57° C. within the period of time, during which the electrodes are contacting the same cross section of the sausage mass between each other.

The second conveyor belt preferably is adapted to convey the fermented, respectively acidified and in step 8) warmed sausage mass into a holding space, which is temperature-controlled to a temperature of approximately 57° C. for step 9). Preferably, this holding space has a conveyor device, which is adapted to convey the sausage mass through the holding space for the duration of the incubation. Therein, the conveyor device in the holding space preferably is connected to the second conveyor belt such that the sausage mass is continuously taken over from the second conveyor belt, optionally with a cutting device for cutting the sausage mass into sections.

Connected to the holding space the device has a third conveyor belt, which is adapted to take over the sausage mass, which is warmed and fermented, respectively acidified after step 9), and to convey the same through a cooling device arranged on the third conveyor belt, in which vacuum is applied to the sausage mass. The cooling device is temperature-controlled such that the cooked fermented sausage mass is cooled to −1° C. or below within at maximum 30 min with vacuum being applied, according to step 10). The cooling device has an entry lock sealing the internal space of the cooling device against the cooked fermented sausage mass at least partly and an exit lock sealing the internal space of the cooling device against the cooled sausage mass at least partly. The entry lock and the exit lock may have, for example, sealing lips, optionally with rollers, which are loaded against the sausage mass or against its cross section, and/or fins attached radially to a circumferential wheel, which extend transversally to the conveying direction of the third conveyor belt and are adapted to being pressed into the sausage mass for sealing. The cooling device has a vacuum source, which maintains the vacuum applied to the cooling device, preferably by means of a condenser, in order to condense or freeze out water vapour from the gas, which is sucked off the cooling device.

An additional cooling system optionally may be connected to the cooling device, which is adapted to further cool the cooled cooked sausage mass in step 11). A cutting machine may be connected to the cooling device, preferably to the additional cooling system, preferably in conveying direction of the third conveyor belt, which is running through the cutting machine. An additional drying device may be connected to the cutting machine, which preferably is adapted to further dry in step 13) the cut, cooked and cooled sausage product at −2° C. or below with vacuum being applied, e.g. at 20 hPa absolute pressure.

Preferred embodiments of the invention will now be discussed with respect to an example of continuous production of salami and the drawing. The drawing may include schematic representations, which will be understood by artisans in view of the general knowledge in the art and the description that follows. Features may be exaggerated in the drawings for emphasis, and features may not be to scale.

Example: Continuous Production of Salami 4.2 kg (35%) frozen lean pork belly (approx. 28% fat),
4.32 kg (36%) frozen pork belly (approx. 58% fat) and 0.64 kg (5%) frozen beef (approx. 50% fat), in each case −18° C., were comminuted by grinding through a 3 mm-perforated plate and subsequently filled into a cutter together with separately ground 3.0 kg (25%) fresh lean pork belly (approx. 28% fat), then 1.65 kg cold water, 0.6 kg soy protein isolate, 0.42 kg curing salt, 0.09 kg liquid seasoning, 0.075 kg glucose, 0.0075 kg ascorbic acid, and a starter culture were added and further comminuted by cutting and mixed to produce a raw sausage mass.

FIG. 1 shows the apparatus used for the further processing of the raw sausage mass. The raw sausage mass 1 was formed through a nozzle 2 having a rectangular outlet as the forming unit onto a first conveyor belt 3 resulting in a strand of rectangular cross section. The first conveyor band 3 runs through a first electrical warming device 4, which is insulated against the first conveyor belt 3. Alternatively, the sections of the first conveyor belt 3, which passes the first electrical warming device 4 is insulated from the other sections of the first conveyor belt 3 and forms itself the one electrode. The contact time of the electrodes to the raw sausage mass was approximately 5 min, during which time the first conveyor belt 3 conveyed the raw sausage mass 1 through the first electrical warming device 4. Electric power was applied to the electrodes of the first electrical warming device 4, which warmed the raw sausage mass 1 from originally −4° C. to 35° C. during the passage to a formed raw warmed sausage mass 5.

The first conveyor belt 3 conveyed the formed raw warmed sausage mass into a fermentation room 6, which was temperature-controlled to 35° C. and in which a paternoster was installed as the conveyor device, which conveyed the formed raw warmed sausage mass 5 during an incubation duration of 7 h through the fermentation room. After the fermentation room 6 the formed fermented sausage mass 7 thus produced was delivered to a second conveyor belt 8, which ran through a second electrical warming device 9, which had two electrodes to which current was applied, which contacted the formed sausage mass 7 and warmed the same from approximately 35° C. to approximately 57° C. during the passage. Preferably, current having an electric power sufficient for a warming within 5 to 20 min was applied to the electrodes.

The second conveyor belt 8 conveys the sausage mass into a holding space 10, which is temperature-controlled to 57° C. and has a paternoster as the conveyor device, which is adjusted to a dwell time of approximately 1 h. The cooked fermented sausage mass 11 conveyed out of the holding space 10 is taken over by a third conveyor belt 12 arranged adjacent to the holding space 10 and conveyed through a cooling device 13, which generates a vacuum of approximately 20 hPa absolute between an entry lock 14 and an exit lock 15 and is cooled. During the passage in the course of 10 min through the cooling device the cooked fermented sausage mass 11 is cooled from approximately 57° C. to −2° C. and is dried by approximately 10% water.

A cutting device 16 connected to the cooling device 13 and, as an additional drying device 18, a vacuum dryer is shown, which, for example is adjusted to 20 hPa absolute pressure. It turned out that the process, as a whole, leads to a product, in which the fat and protein of the initial raw sausage mass essentially is completely contained in the dried and cooled cooked sausage mass.

REFERENCE SIGNS 1 raw sausage mass
2 nozzle
3 first conveyor belt
4 first electrical warming device
5 formed raw warmed sausage mass
6 fermentation room
7 formed fermented sausage mass
8 second conveyor belt
9 second electrical warming device
10 holding space
11 cooked fermented sausage mass
12 third conveyor belt
13 cooling device
14 entry lock
15 exit lock
16 cutting device
17 additional drying device While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A process for producing sausage products comprising the steps of
   comminuting of raw meat at a temperature of the meat of from 4° C. to −10° C.;
   adding of seasoning and an acidifying agent, which is a starter culture and/or gluconodeltalactone;
   mixing to produce a raw sausage mass;
   forming of the raw sausage mass into a formed raw sausage mass at a temperature of from 4° C. to −10° C.;
   first warming of the formed raw sausage mass by applying electric current with a power sufficient to reach 30° C. to 37° C. within 30 s to 10 min;
   fermenting of the formed raw sausage mass until reaching a pH value of from 4.6 to 5.2 by incubating at 30° C. to 37° C. for 7 to 10 h;
   second warming of the formed raw sausage mass to a temperature of approximately at least 42° C. by applying electric current with a power sufficient to reach 42° C. within 10 min to produce a warmed sausage mass; and
   immediately subsequently cooling the warmed sausage mass for a maximum of 30 minutes to −1° C. or below while a vacuum is applied, to produce a dried and cooled sausage mass;
   cutting of the dried and cooled sausage mass to obtain a cut and cooled sausage product.

2. The process according to claim 1, wherein the comminuting comprises comminuting frozen meat with fat at a temperature of −18° C., comminuting fresh meat with or without fat at a temperature of 0° C. to 5° C. and subsequently or simultaneously mixing the comminuted frozen meat and the comminuted fresh meat.

3. The process according to claim 1, wherein the additives are selected from liquid seasoning, glucose, ascorbic acid, and vegetable protein.

4. The process according to claim 1, wherein the mixing is carried out by means of a tumbler, cutter or different mixing device at a temperature of the raw sausage mass of from −2° C. to −10° C.

5. The process according to claim 1, wherein the fermenting is carried out for 6 to 24 h.

6. The process according to claim 1, wherein the first warming is carried out by applying electric current with a power sufficient to reach 30° C. to 37° C. within 1 to 5 min.

7. The process according to claim 6, comprising, after the second warming, incubating at a temperature of at least 57° C. for 45 min to 90 min.

8. The process according to claim 1, comprising vacuum drying the cut and cooled sausage praoduct at a temperature of −2° C. or below.

9. A process for producing sausage products, consisting of the steps of
comminuting of raw meat at a temperature of the meat of from 4° C. to −10° C.;
adding of seasoning and an acidifying agent, which is a starter culture and/or gluconodeltalactone;
mixing to produce a raw sausage mass;
forming of the raw sausage mass into a formed raw sausage mass at a temperature of from 4° C. to −10° C.;
first warming of the formed raw sausage mass by applying electric current with a power sufficient to reach 30° C. to 37° C. within 30 s to 10 min;
fermenting of the formed raw sausage mass until reaching a pH value of from 4.6 to 5.2 by incubating at 30° C. to 37° C. for 7 to 10 h;
second warming of the formed raw sausage mass to a temperature of approximately at least 42° C. by applying electric current with a power sufficient to reach 42° C. within 10 min to produce a warmed sausage mass; and
immediately subsequently cooling the warmed sausage mass for a maximum of 30 minutes to −1° C. or below while a vacuum is applied, to produce a dried and cooled sausage mass;
cutting of the dried and cooled sausage mass to obtain a cut and cooled sausage product.

10. The process according to claim 1, wherein the steps of claim 1 proceed continuously and the sausage mass is continually conveyed, with or without additionally cutting the sausage mass transversely to the conveying direction.

11. The process according to claim 1, wherein the second warming is carried out to a temperature of at least 57° C. for a time sufficient for germ reduction.

12. The process according to claim 1, wherein the adding comprises adding curing salt.

13. The process according to claim 1, further comprising comminuting the raw sausage mass after the mixing and before the forming.

14. The process according to claim 1, wherein the forming comprises depositing formed raw sausage masses onto a continuously running conveyor belt during the forming.

15. The process according to claim 1, wherein the forming includes applying pressure.

16. The process according to claim 1, wherein the immediately subsequently cooling comprises cooling to a temperature of −10° C. or less.

17. The process according to claim 1, comprising continually conveying the raw sausage mass during the forming, continually conveying the formed raw sausage mass during the first warming, fermenting and second warming, continually conveying the warmed sausage mass during the immediately subsequently cooling, and continually conveying the dried and cooled sausage mass during the cutting.

* * * * *